United States Patent
Martin et al.

[11] Patent Number: 5,902,198
[45] Date of Patent: May 11, 1999

[54] BASKETBALL BACKBOARD WITH SHATTER-RESISTANT PROPERTIES

[75] Inventors: Donald C. Martin, Martinsville, Va.; E. Weldon Herndon, Jr., Durham, N.C.

[73] Assignee: Clear Defense Incorporated, Martinsville, Va.

[21] Appl. No.: 08/866,515

[22] Filed: May 30, 1997

[51] Int. Cl.[6] .................................................. A63B 63/08
[52] U.S. Cl. ............................................................ 473/481
[58] Field of Search ..................................... 473/479, 481

[56] References Cited

U.S. PATENT DOCUMENTS

| | | |
|---|---|---|
| 1,736,879 | 11/1929 | Gross . |
| 1,789,363 | 1/1931 | Gross . |
| 3,388,032 | 6/1968 | Saunders ................................. 428/215 |
| 3,499,783 | 3/1970 | Nelson et al. ........................... 428/161 |
| 4,194,734 | 3/1980 | Tyner . |
| 4,285,518 | 8/1981 | Pearo . |
| 4,320,896 | 3/1982 | Engle et al. . |
| 4,583,732 | 4/1986 | Allen . |
| 4,588,188 | 5/1986 | Mahoney et al. . |
| 4,983,461 | 1/1991 | Daude et al. ........................ 428/423.1 |
| 5,037,092 | 8/1991 | Blackburn . |

*Primary Examiner*—William H. Grieb
*Attorney, Agent, or Firm*—Rhodes, Coats & Bennett, L.L.P.

[57] ABSTRACT

A shatter-resistant basketball backboard is provided, which comprises a tempered glass basketball backboard having a front surface and back surface; and a plastic film adhered to the rear surface of the backboard. In preferred embodiments, the plastic film is comprised of at least one plastic layer and an adhesive layer. The plastic film can have a release liner adjacent to the adhesive layer, and a scratch resistant coating adjacent to the plastic layer. Ultraviolet resistance properties can also reside in the film or adhesive. The plastic film can be made of polyethylene terephthalate, polycarbonate or like materials. Plastic film can be applied either in an OEM or retrofit installation.

16 Claims, 5 Drawing Sheets

BASKETBALL BACKBOARD WITH SHATTER-RESISTANT PROPERTIES

FIELD OF THE INVENTION

The present invention generally relates to basketball goals and more specifically to an improved shatter-resistant tempered glass backboard with a transparent plastic film adhered thereto.

BACKGROUND

The shattering of glass basketball goals during play has become a serious impediment to the safety of the participants. Current glass backboards typically are one-half (½) to three-eighth (⅜) inch tempered glass. When subjected to appropriate forces, such as during a player's dunk or other force applied to the rim, the tempered glass is stressed beyond its elastic limit and shatters into a myriad of small glass pieces. Typically, these pieces are roughly oblong, and approximately one-half (½) to one (1) inch long. These glass projectiles rain down on the players on the court, creating a possibility for skin lacerations and serious eye injury. Also, the shower of glass pieces can ricochet towards participants positioned courtside, such as cheerleaders, ball boys, cameramen and spectators. The danger to the safety of people at the game cannot be ignored by sports arena owners and operators.

In addition to the safety issues, the shattering of a glass backboard creates clean-up problems. Maintenance personal must carefully locate and remove thousands of glass particles that have fallen to the floor and slid under objects. Missing just a single piece can cause great damage if a player subsequently falls on the glass fragment. Also, even if some portions of the shattered glass do not fall to the floor during breakage, they likely will during replacement operations.

Finally, the shattering of backboard can also have a significant effect on the tempo of the game. The time necessary to clean-up and replace a backboard can cause a long delay in the game, possibly affecting the momentum experienced by one or both teams. Also, there is a feeling of machismo associated with the shattering of a glass backboard, allowing the team inflicting such damage to gain a perceived or real emotional advantage. Such events and passion can influence the outcome of a sporting event.

Recent attempts to address the above problems focus upon decreasing the stresses imparted to the glass backboard during play. Such attempts primarily address the mounting of a basketball rim to a basketball goal. See, e.g., U.S. Pat. Nos. 4,588,188 and 5,037,092. While these latest attempts may reduce the incidence of backboard shatter for new installations, backboards continue to shatter all too frequently. None of these solutions seek to restrain the glass particles from dismantling from the backboard unit once the inevitable breakage occurs. Also, apparently no prior art solutions have targeted broken glass retention systems which can be applied to existing installations in a retro-fit manner to decrease their hazardous potential.

Thus there is a need in the art for an improved glass backboard goal that minimizes the ill effects of the shattering of tempered glass.

SUMMARY OF THE INVENTION

A shatter-resistant basketball backboard is provided, which comprises a tempered glass basketball backboard having a front surface and back surface; and a plastic film adhered to the rear surface of the backboard. In a preferred embodiment, the plastic film is comprised of at least one plastic layer and a mounting adhesive layer. The plastic film can have a release liner adjacent to the adhesive layer, and a scratch-resistant coating adjacent to the plastic layer. Ultraviolet resistance properties can also reside in the film or adhesive. The plastic film can be made of polyethylene terephthalate, polycarbonate or like materials. Plastic film can be applied either in an OEM or retrofit installation.

These and other aspects of the present invention as disclosed herein will become apparent to those skilled in the art after a reading of the following description of the preferred embodiments when considered with the drawings.

The drawings are for the purpose of describing a preferred embodiment of the invention and are not intended to limit the present invention.

DESCRIPTION OF THE PREFERRED EMBODIMENTS

Figure 1:
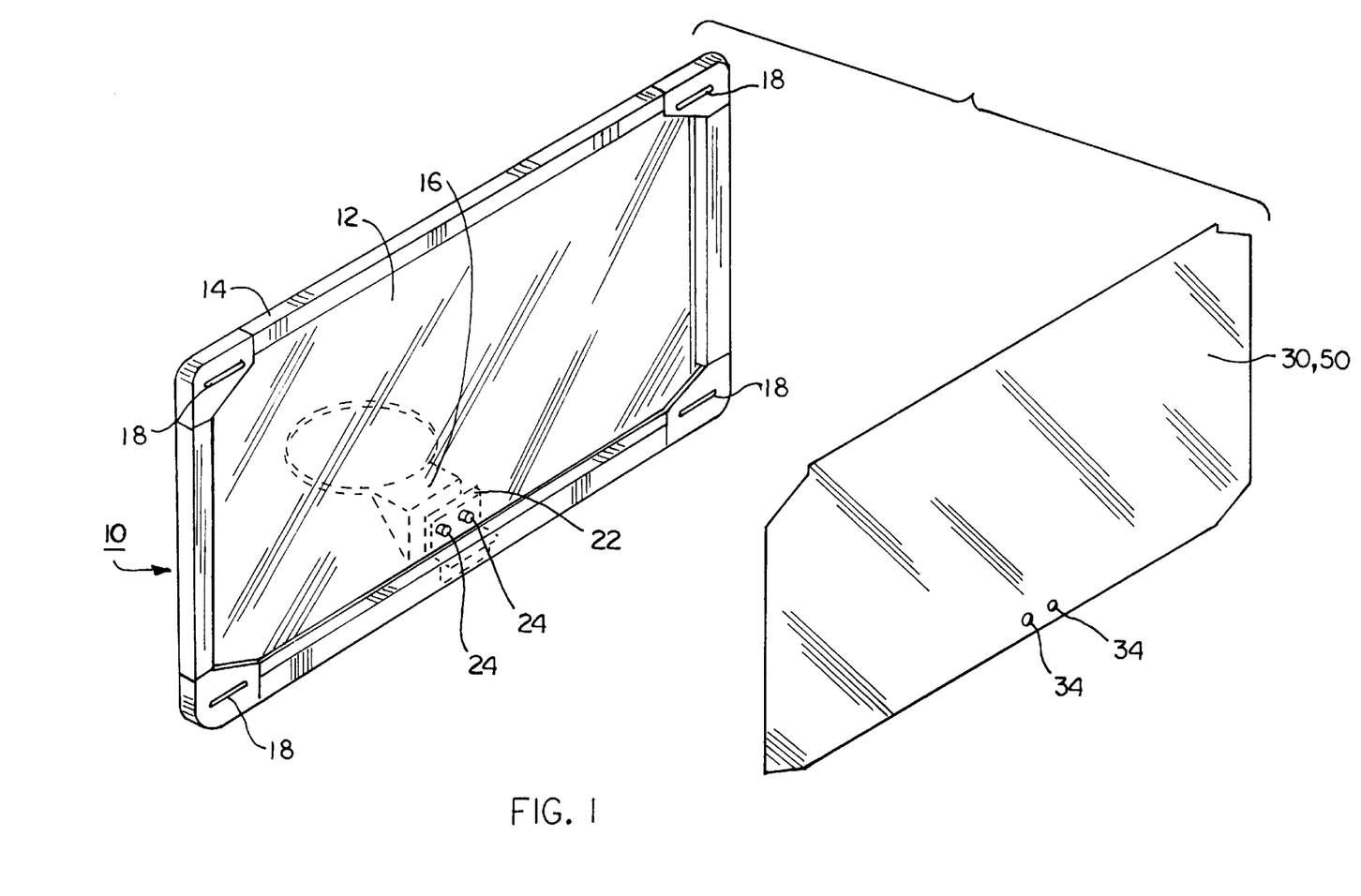
FIG. 1 is an exploded view of a basketball backboard.

FIG. 1 is an exploded view of a basketball backboard illustrating an embodiment of this invention. The backboard 10 comprises a one-half (½) to three-eighth (⅜) inch tempered glass section, a mounting frame 14 and a goal assembly 16 (shown in dashed lines). Mounting slots 18 allow attachment of the backboard to the support structure stand (not shown). The mounting frame 14 typically includes a "U" shaped injection molded neoprene gasket (not shown) along the perimeter of the glass 12, protecting the glass from the frame 14.

The goal assembly 16 is attached to the glass 12 and mounting frame 14 through a goal anchor assembly 22. The goal anchor assembly is mounted through holes 24 in the glass and secures the goal to the glass 12 and mounting frame 14. The goal assembly 16 can be a breakaway type to release the rim portion thereof when excessive force is applied thereto. In typical backboards, a target area (not shown) and edge border (not shown) are applied by conventional technologies, e.g., screen printing, to the front of the glass surface.

The drawing of the backboard 10 and related elements is intended to represent a conventional glass backboard being sold and used today. This invention can be practiced on a wide variety of backboard configurations and mounting hardware.

A plastic film 30, 50 also is shown in FIG. 1. In a retro-fit installation, the plastic film 30, 50 is cut to size, to approximately fill the exposed glass surface area of the rear surface of the backboard 10. In a preferred embodiment, the goal anchor assembly 22 is first removed from the backboard 10 prior to application of the plastic film 30, 50. The film 30, 50 is then properly applied to the back surface of the glass 12, as discussed below. Access holes 34 are then created in the film, so that the goal anchor assembly 22 can be reattached.

Figure 2:
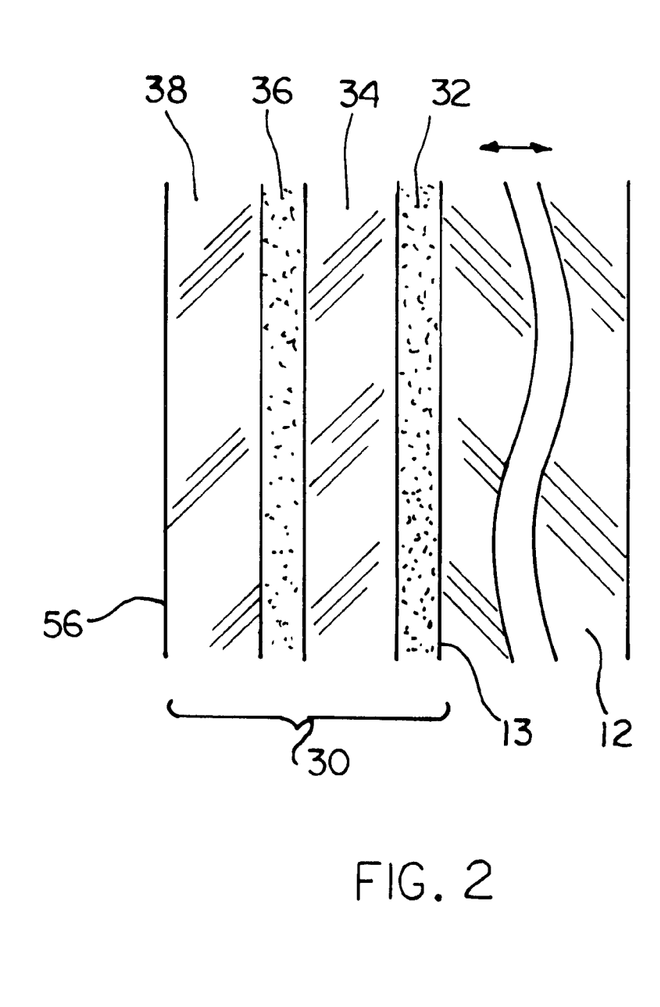
FIG. 2 is a cross section of a basketball backboard showing a preferred embodiment.

FIG. 2 illustrates a cross section of the plastic film 30 in a preferred embodiment, after mounting has occurred on the glass 12. The glass 12 (shown of undetermined width in FIG. 2) typically is a one-half (½) to three-eighth (⅜) inch optically clear tempered glass. The back surface 13 of the glass is on the rear of the backboard, and usually is not contacted by the ball or other playing object. The plastic film 30 in this embodiment is comprised of a film-to-glass mounting adhesive layer 32, a first plastic layer 34, a film-to-film adhesive layer 36, and a second plastic layer 38.

Figure 3:
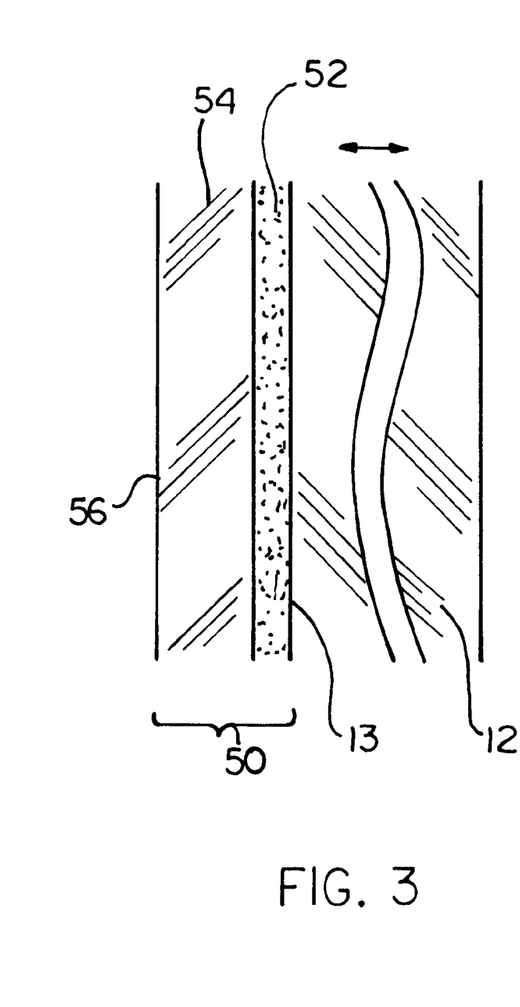
FIG. 3 is a cross section of a basketball backboard, showing an alternative embodiment.

FIG. 3 illustrates an alternative embodiment for the plastic film 50 bonded to tempered glass 12. As with the previous embodiment, a film-to-glass mounting adhesive 52 bonds a plastic layer 54 to the rear surface 13 of the glass 12.

The plastic layers 34, 38 and 54 typically are comprised of a polymerized ethylene resin (P.E.T. or polyethylene terephthalate). Alternatively a polycarbonate film could be used. In the embodiment shown in FIG. 2, both plastic layers 34 and 38 are approximately 4 mils (approximately 100 microns) thick. Also, in a preferred embodiment, the outer plastic layer, 38, 54 has a scratch resistant coating 56 applied to the outer surface. This coating protects the film during normal cleaning and maintenance. Also, in a preferred embodiment, the film includes ultraviolet (UV) light protectors or inhibitors, either applied as an external coating, or applied within the film or adhesives.

The film-to-glass bonding adhesive 32 and 52, in a preferred embodiment, already is applied to the plastic layer 34, 54 when the plastic film is obtained from a film supplier. The adhesive 32, 52 is exposed by removing a release liner (not shown) prior to application to the glass 12. The adhesive must have sufficient bonding strength so that the majority of the glass particles will remain bonded to the film 30, 50 after breakage. Also, the adhesive must be substantially optically clear to not distort the existing clarity of the glass 12. In a preferred embodiment, the adhesive is selected from the following group: acrylic copolymer pressure sensitive adhesive; an acrylic-vinyl acetate pressure sensitive adhesive; or a vinyl ether polymer pressure sensitive acetate adhesive. Adhesive density typically is approximately fourteen (14) pounds per ream. After application, the adhesive layer typically consumes no more than 1 mil of thickness.

The film-to-film laminating adhesive 36 shown in FIG. 2 also must be substantially optically clear, and can be formed from the following: acrylic copolymer pressure sensitive adhesive; an acrylic-vinyl acetate pressure sensitive adhesive; or a vinyl ether polymer pressure sensitive acetate adhesive. Laminating adhesive density typically is seven (7) pounds per ream.

Suitable suppliers of pressure sensitive adhesives and scratch resistant coatings include National Starch & Chemical Corp., Ashland Chemical Co., and Morton International, Inc.

Plastic film 30, 50 of the type used herein can be obtained from many suppliers of safety and security film, such as Clear Defense Incorporated, 121 E. Main St., Martinsville, Va., Model Numbers, CD 225 Clear and CD 125 Clear. Preferred properties for each are as follows:

TABLE

FILM PROPERTIES

| | CD 125 CLEAR | CD 225 CLEAR |
|---|---|---|
| PHYSICAL PROPERTIES | | |
| Number of Film Layers | 1 | 2 |
| Laminate Thickness (including adhesive) inches (microns) | 0.005 (120) | 0.009 (225) |
| Tensile Strength - PSI | 28,000 | 28,000 |
| Break Strength - lbs/inch | 110 | 225 |
| Peel Strength - lbs/inch | 9 | 8 |
| SOLAR PROPERTIES | | |
| Solar Transmittance - % | 82 | 82 |
| Solar Reflectance - % | 10 | 10 |
| Solar Absorptance - % | 8 | 8 |
| Visible Light Transmittance - % | 93 | 93 |
| U-Factor | 1.02–1.13 | 1.02–1.13 |
| Shading Coefficient | 0.94 | 0.94 |
| Ultraviolet Light Transmitted - % | 0–10 | 0–8 |
| Total Solar Energy Rejected - % | 17 | 17 |

The above property parameters are well known in the art, and the information provided herein can be used by those skilled in the art to select proper film to practice this invention. The tensile and break strength values above were measured in accordance with the following standards: ASTM D 882-75 (American Society for Testing Materials); ASTM 1004-76; ASTM D 1938-67. The lbs/inch values above is per linear inch of width. All solar data has been measured in accordance with AIMCAL standards (Association of Industrial Metalizers, Coaters and Laminators).

Figure 4:
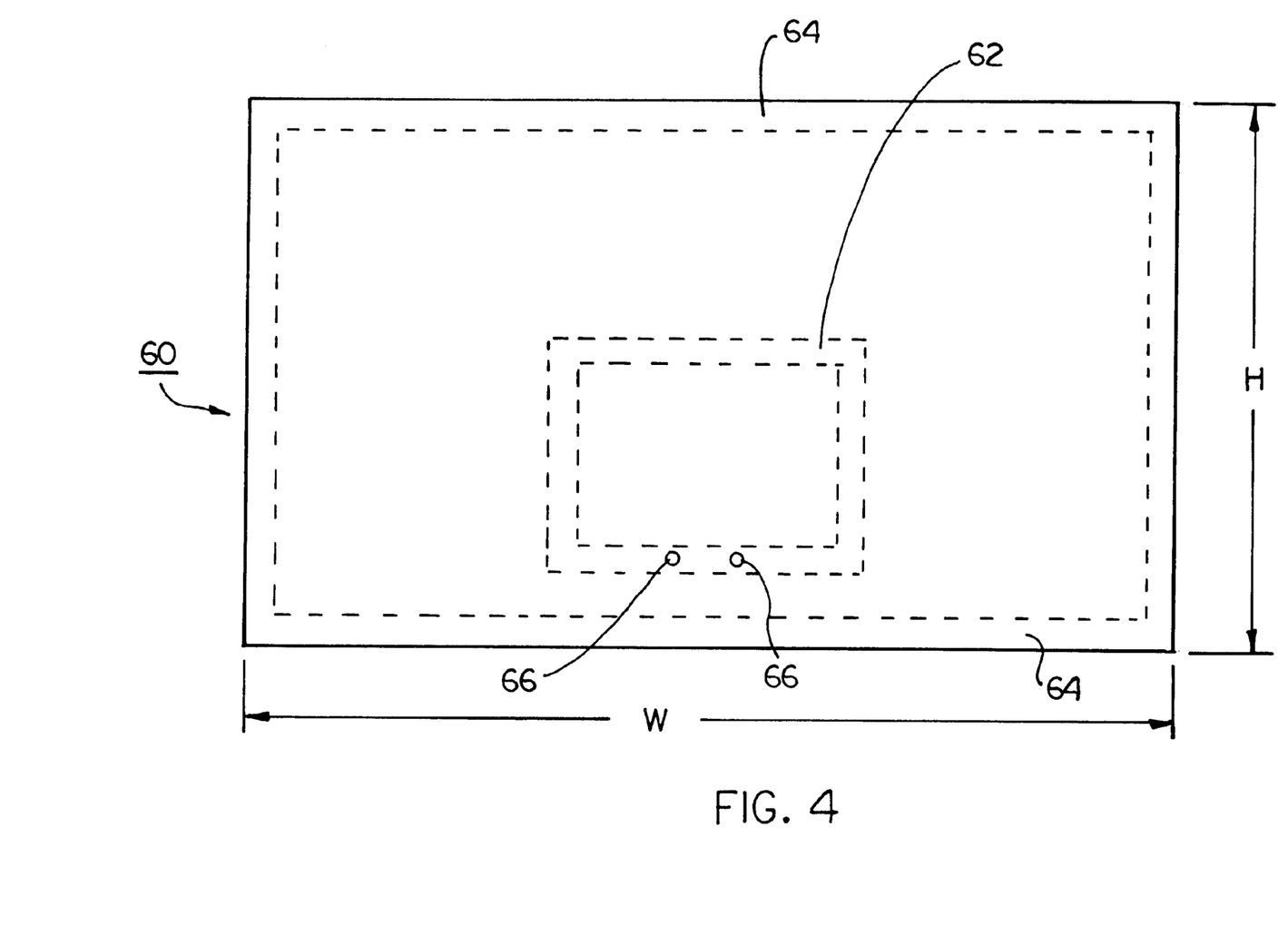
FIG. 4 is a rear view of a glass section, intended to serve as a basketball backboard when combined with mounting accessories and hardware.

FIG. 4 illustrates the rear view of a tempered glass section 60, which is intended to be used in a backboard assembly 10. Mounting hardware has not been added. At this stage of production, the glass section 60 can be approximately 71.5 inches in width W, and 41.5 inches in height, H. A rectangular target area 62 is applied directly on the glass 60, through conventional techniques, e.g., ceramic screen printing or the like. An outer edge border 64 surrounds the perimeter of the front of the glass, and will be partially covered up when the mounting frame (not shown) is installed. Through holes 66 accept the goal anchor assembly. In an original equipment manufacturer (OEM) installation, the plastic film 30 or 50 is applied directly to the rear surface of the glass section 60, in the manner described below. The film is cut to fill up the entire rear surface area, and then applied to the glass. Holes in the film are then made to allow access through holes 66 for the goal anchor assembly. If additional holes (not shown) are provided in the corner of the glass for the mounting frame, like holes can be made into the film to accommodate them.

Figure 5A:
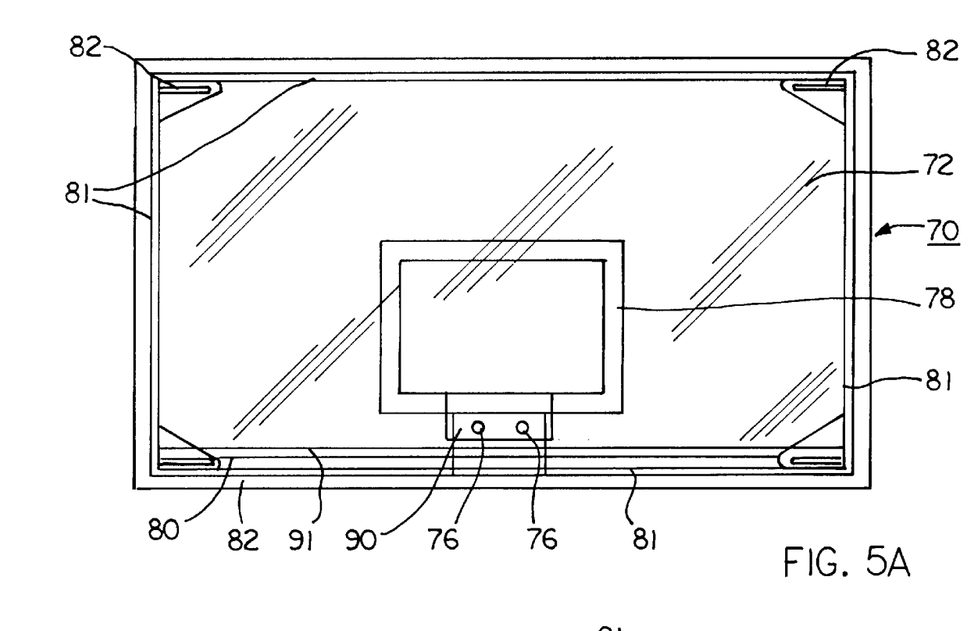
FIG. 5A is a front view of a basketball backboard.

FIG. 5A shows a front view of a basketball goal 70 with tempered glass 72, mounting frame 74, holes 76 and a target area 78. For this type of backboard, a rear horizontal member 80 may extend above the height of a front horizontal support member 82. In another embodiment, an additional section(s) of plastic film 90, 91 is applied to the front surface of the glass 72 for additional protection in this area of the backboard. The plastic film may be comprised of one or more layers of plastic, such as that shown by Elements 30 or 50. The mounting slots 18 and related structure are partially visible through the glass 72 in FIG. 5A.

Figure 5B:
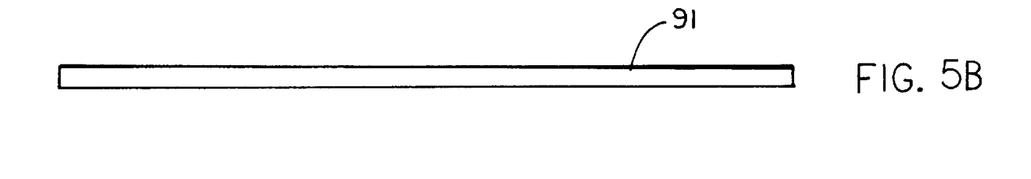
FIG. 5B depicts a plastic film according to this invention.
Figure 5C:
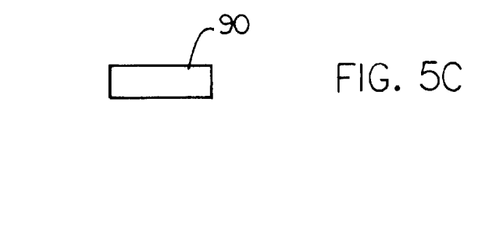
FIG. 5C depicts another plastic film according to this invention.

FIGS. 5A and 5B depict a plastic film strip 91 that can be applied on the bottom portion of the glass 72, below or at or above the bottom portion of the ceramic screen printed border 81. Plastic film 90 is shown in FIGS. 5A and 5C and can also be applied to the front surface of the glass 72 for added protection.

The method of applying plastic film 30, 50, 90, 91 to tempered glass makes use of tools, commonly available to the plastic film industry. Tools that can be used include the following:

TABLE

APPLICATION TOOLS

6" Scraper
Pro Handle/12" Cleaning Squeegee
Lint-free Paper Towels
6" Pro (Power) Squeegee
Stainless Olfa Cutting Knife
5 Way Cutting Guide
Square PVC Bumper
Polly 11 Pressure Sprayer
Drop Cloth (if Backboard is lowered to gym floor for installation of system)
1⅛" Open Face Wrench
Adjustable ½" Wrench The method of applying plastic film 30, 50, 90 to tempered glass for an existing installation can involve the following steps:

General

Preferably the glass should be room temperature.

Apply the film in a relatively clean environment. It is not desirable to allow dust or other particles to be trapped between the mounting adhesive and glass.

Site Preparation

Use a lint free (preferably cotton twill or calico) drop cloth to extend four feet out in front of the backboard and four feet behind the backboard (assuming that the backboard will be lowered to the gym floor to install the system)

Installers should wear only cotton "lint free" clothes and a cap or hair net (if installers have long hair) to reduce lint or hair from being drawn to the film adhesive by static electricity as the release liner is removed from the mounting adhesive side of the film.

Slip Solution

Prepare an aqueous slip solution, preferably of distilled water, mixed with a gentle shampoo (preferably Johnson and Johnson's baby shampoo-yellow colored, not pink) as follows:

On cool to average room temperature glass surfaces, use ¾ teaspoon of shampoo to a pint of distilled water On hot glass surfaces (85 degrees Fahrenheit or above), use 1 teaspoon of shampoo to a pint of distilled water On cold glass surfaces (45 degrees Fahrenheit or below), use less than ½ teaspoon of shampoo to a pint of distilled water The slip solution is considered a contaminant in the final installation. Therefore, careful attention should be paid to the above instructions to ensure proper adhesion and clarity.

Removing Goal Assembly

Use appropriate tools (e.g., the ½" adjustable wrench and the 1-⅛" open face wrench) to remove both the goal and the assembly unit (including the polycarbonate support plates, if any, on both the front and backside of the backboard).

Be sure that the entire goal assembly unit is removed so that the installer of the film can have access to the back and front glass surface surrounding the goal area of the glass surface.

Cleaning the Glass

Figure 6:
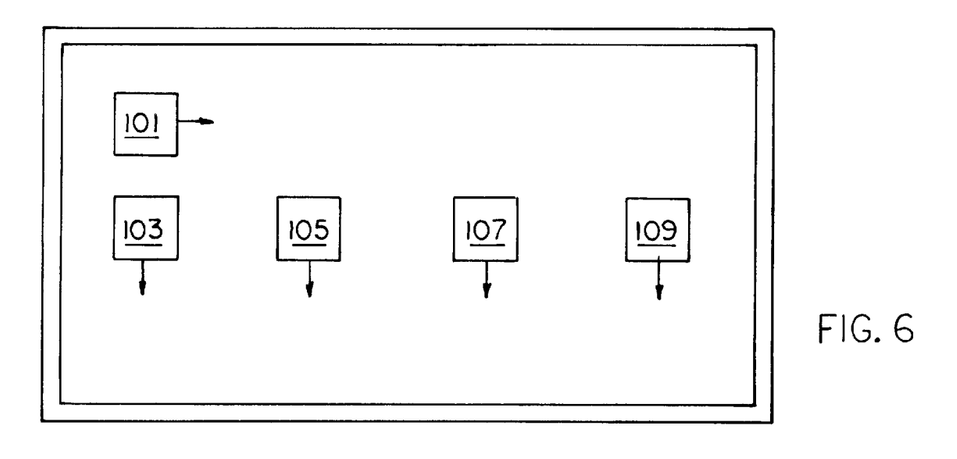
FIG. 6 is a rear view of a basketball backboard.

Spray the back surface of the glass backboard thoroughly with the slip solution and clean the surface with a suitable scraper (e.g., 6" Scraper) to clean the surface in the following pattern as shown in FIG. 6. First scrape horizontally in the 101 direction shown in 101, followed by the 103, 105, 107 and 109 directions.

After the back of the glass backboard is "razor" cleaned, spray the surface again and use the cleaning squeegee to remove any debris left behind by the razor cleaning. Wipe around the edges with "lint-free" paper towels. Do not wipe the glass surface with paper towels.

For an embodiment incorporating plastic film on the front side of the backboard, spray the front of the glass backboard and clean it with the squeegee. Use the same pattern as shown in FIG. 6. While the film will only cover the goal mounting area, the entire front of the backboard should be cleaned with the cleaning squeegee. Next, wipe around the edges with the "lint-free" paper towels.

Application of the Film

Installation on the back surface of the backboard (preferably, should be done first before applying film to front surface if front surface application is planned):

Spray the back surface of the backboard, starting at the bottom right corner and continue with a sweeping motion pattern from right to left until the entire board is covered with the slip solution.

When using plastic film incorporating a release liner, the release liner must be "peeled" from the adhesive side of the film and the adhesive must be sprayed simultaneously with the slip solution to avoid static electricity pulling dust into the adhesive.

Re-wet the glass surface again, thoroughly.

Re-wet the adhesive side again.

Then, apply the film to the back surface of the backboard.

Squeegeeing

Figure 7:
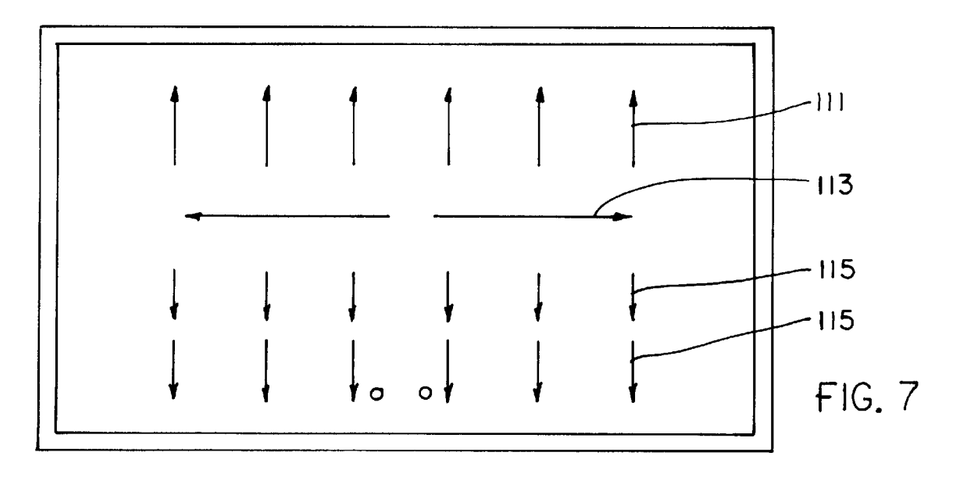
FIG. 7 is a rear view of a basketball backboard.

Spray the entire surface of the film with the slip solution. Position film and squeegee (e.g., 6" pro (power) squeegee) in the directions as shown in FIG. 7 using two hands and squeegeeing relatively hard upward 111 to tack the top first.

Then from the middle, proceed to tack horizontally 113 across the top.

After tacking the top, start the downward 115 strokes. Such actions should remove substantially all of the moisture from the slip solution, so that a proper bond can form between the film and glass.

When doing the vertical squeegeeing 111 and 115, the strokes should overlap by 50% and the strokes should be not longer than 6"–8". Use the square PVC Bumper, wrapped in a paper towel (to protect the film and to absorb the moisture pushed to edges), to "bump" all the film edges.

Re-wet the film surface using the slip solution and repeat above squeegeeing steps.

"Tuck" or "tack" the edges of the film behind the steel frame of the backboard.

Any debris or foreign particles caught between film and glass should be removed before completing the first squeegeeing. Thoroughly wet any film lifted from the glass as well as the glass before re-applying the film back onto the glass. Insure that you squeegee the slip solution back past the water-line left from the initial lifting of the film before continuing to do the final squeegee.

Miscellaneous

Because of the aggressive mounting adhesive on the film, it will grab if insufficient slip solution is sprayed on the glass, causing adhesive drag smear marks.

Tap water contains certain amounts of minerals and salts which have been found to contaminate the bond between the film and the glass surface.

Application of the Reinforcement Panels on the Front Surface (if applicable)

Spray the front surface of the backboard and clean it again with the slip solution and cleaning squeegee.

Select the proper film strip for the desired size, e.g., 1½"×69¼inch strip for bottom section of backboard (Element 91 of FIGS. 5A and 5B).

Remove the release liner, using the same technique as described earlier, and apply the film:

Install the strip of film along the bottom of the front surface, lining-up the top of the film strip with the top of the target ceramic screen printed outline of the board and "tuck" and "tack" the bottom of the film about ¼" behind the steel frame (see diagram below):

Provide a second (if desired) plastic film (e.g., 5½"×10") (element 90 of FIGS. 5A and 5C).

Remove the release liner and apply the film panel, using the same techniques as outlined above.

Install the panel 90 in the middle of the board directly over the two holes in the backboard provided for the goal installation (see, e.g., element 90 of FIGS. 5A and 5C) and then Position the bottom of the panel 90 against the top of the film strip 91 applied in the prior step, leaving a ⅛" light line between the two pieces. The two pieces of film 90 and 91 preferably should not touch.

Final Installation Steps

Take the PVC Square Bumper and wrap in a paper towel and bump all the edges of the film again.

If any rough edges are discovered, or edges which are too tight against the frame (edges puckered up), use the 5 Way Cutting Guide and the Stainless Olfa Cutting Knife to trim such edges so the film can lay smooth and flat against the glass.

Using a suitable knife, e.g., the Olfa Cutting Knife, cut the film on the back and front of the backboard where it overlays the two holes in the backboard (same holes provided for installing the goal). The cut should be smooth and angled back away from the hole so the film will not touch the bolts used in installing the goal (otherwise the film may finger if the bolts come into contact with the edge of the film around the holes).

Perform one final bumping around the holes with the PVC Square Bumper, wrapped in a paper tower.

Wait approximately two (2) hours after all the above steps have been completed and re-install the Basketball Goal Assembly unit, including the acrylic support plates on the front.

With practice, the above steps can be accomplished in quicker time and with greater acumen. However, the above steps arc not so complicated as to necessarily require skilled craftsman, and it is contemplated that installations can be performed by maintenance or other suitable personnel already employed at the area or other establishment housing the backboard.

For OEM installations, the above procedures can also apply, eliminating the steps involved with removal of existing hardware and other non-essential steps. Also, the film can be applied all the way to the edges of the glass, since the frame has yet to be installed on the glass backboard.

The term "shatter-resistant" as used herein refers to the functioning of the plastic film in assisting in the retention of glass in the backboard after breakage. Thus, the film helps avoid a shattering or showering of the glass particles after breaks.

While the discussion above pertains primarily to a basketball backboard, it should be understood that the broken glass retention properties of the plastic film described above can also prove beneficial when the film is mounted on other recreational glass surfaces. Such recreational glass surfaces include partitions used along the perimeter of hockey rinks, as well as the glass used in slot machines, pinball machines, video games, and other surfaces where glass is preferred but a breakage is possible or imminent.

The above description of the preferred embodiments thus detail many ways in which the present invention can provide its intended purposes. While several preferred embodiments are described in detail hereinabove, it is apparent that various changes might be made without departing from the scope of the invention, which is set forth in the accompanying claims.

We claim:

1. A shatter-resistant basketball backboard comprising:
   a. a tempered glass basketball backboard having a front surface and back surface;
   b. a glass-retaining plastic film adhered to the rear surface of the backboard wherein the plastic film assists in the retention of a substantial portion of the glass in the backboard after breakage.

2. The shatter-resistant basketball backboard of claim 1, where the plastic film is comprised of at least one plastic layer and an adhesive lever.

3. The shatter-resistant basketball backboard of claim 2, where the plastic film further comprises a release liner adjacent to the adhesive layer.

4. The shatter-resistant basketball backboard of claim 2, where the plastic film further comprises a scratch resistant coating adjacent to the plastic layer.

5. The shatter-resistant basketball backboard of claim 1, where the plastic film has ultraviolet resistance properties.

6. The shatter-resistant basketball backboard of claim 1, where the plastic film has a scratch-resistant coating applied thereto.

7. The shatter-resistant basketball backboard of claim 1, where the plastic film is polyethylene terephthalate.

8. The shatter-resistant basketball backboard of claim 1, where the plastic film is polycarbonate film.

9. The shatter-resistant basketball backboard of claim 2, where the adhesive layer is an acrylic copolymer pressure sensitive adhesive.

10. The shatter-resistant basketball backboard of claim 2, where the adhesive layer is an acrylic-vinyl acetate pressure sensitive adhesive.

11. The shatter-resistant basketball backboard of claim 2, where the adhesive layer is a vinyl ether polymer pressure sensitive acetate adhesive.

12. The shatter-resistant basketball backboard of claim 2, where the plastic film is comprised of a single plastic layer of approximately 4 mils thickness.

13. The shatter-resistant basketball backboard of claim 2, where the plastic film is comprised of a first plastic layer; a second plastic layer, and an adhesive bonding the two layers together.

14. The shatter-resistant backboard of claim 1 where at least one additional plastic film is applied to at least a portion of the front surface of the glass.

15. A basketball backboard comprising:
   a. a glass section with a front and rear surface;
   b. a mounting frame to support the glass section;
   c. a goal assembly;
   d. a plurality of mounting elements for attachment of the mounting frame to a support structure stand;

e. a glass-retaining plastic film located on the rear surface of the glass section wherein the plastic film assists in the retention of a substantial portion of the glass in the backboard after breakage.

16. A shatter-resistant basketball backboard comprising:

a. a tempered glass basketball backboard having a front surface and back surface;

b. a plastic film adhered to the rear surface of the backboard;

c. an adhesive of sufficient properties so that a substantial portion of the tempered glass will remain adhered to the backboard upon breakage.

\* \* \* \* \*

UNITED STATES PATENT AND TRADEMARK OFFICE
CERTIFICATE OF CORRECTION

PATENT NO : 5,902,198
DATED : May 11, 1999
INVENTOR(S): Donald C. Martin and E. Weldon Herndon, Jr.

It is certified that error appears in the above-identified patent and that said Letters Patent is hereby corrected as shown below:

In Column 8, line 27, the last word "lever" should read --layer--.

Signed and Sealed this

Ninth Day of November, 1999

Q. TODD DICKINSON

Attest:

Attesting Officer

Acting Commissioner of Patents and Trademarks